(12) United States Patent
Lipscomb et al.

(10) Patent No.: US 7,290,814 B2
(45) Date of Patent: Nov. 6, 2007

(54) POST HOLE DIGGER

(75) Inventors: Daniel Lipscomb, Prairie du Sac, WI (US); Anthony W. Konkler, Lodi, WI (US); Lorena E. Yin, Madison, WI (US)

(73) Assignee: Fiskars Brands, Inc., Madison, WI (US)

( * ) Notice: Subject to any disclaimer, the term of this patent is extended or adjusted under 35 U.S.C. 154(b) by 0 days.

(21) Appl. No.: 10/819,817

(22) Filed: Apr. 7, 2004

(65) Prior Publication Data

US 2004/0201234 A1    Oct. 14, 2004

Related U.S. Application Data

(60) Provisional application No. 60/461,089, filed on Apr. 8, 2003.

(51) Int. Cl.
*A01B 1/00* (2006.01)
*A01C 5/02* (2006.01)
*A01G 17/16* (2006.01)

(52) U.S. Cl. .................................................. 294/50.8

(58) Field of Classification Search ............... 294/50.8, 294/50.5, 50.6, 50.7, 118; 56/400.12, 400.16, 56/400.18
See application file for complete search history.

(56) References Cited

U.S. PATENT DOCUMENTS

| | | | | |
|---|---|---|---|---|
| 126,773 | A | * | 5/1872 | Ball ........................... 294/50.8 |
| 171,942 | A | | 1/1876 | Lee |
| 208,703 | A | | 10/1878 | Avery |
| 281,137 | A | * | 7/1883 | Rhodes ....................... 294/50.8 |
| 429,903 | A | * | 6/1890 | Gregg ........................ 294/50.8 |
| 437,466 | A | * | 9/1890 | Vogel ......................... 294/50.8 |
| 715,260 | A | | 12/1902 | Griffin |
| 752,115 | A | | 2/1904 | Smith |
| 931,061 | A | | 8/1909 | Hardy |
| 1,222,711 | A | * | 4/1917 | Armstrong, Sr. ........... 294/50.8 |
| 1,706,332 | A | | 3/1929 | Theriot |
| 1,888,929 | A | * | 11/1932 | McDowell .................. 294/50.8 |
| 1,889,929 | A | | 12/1932 | McDowell |
| 2,028,680 | A | | 1/1936 | Mayede et al. |
| 2,074,691 | A | * | 3/1937 | Gilkerson ................... 294/50.8 |

(Continued)

FOREIGN PATENT DOCUMENTS

DE          43860       *   4/1910    ................ 294/50.8

(Continued)

OTHER PUBLICATIONS

European Search Report; European Application No. EP 04 40 0020.

*Primary Examiner*—Patrick Mackey
*Assistant Examiner*—Paul T Chin
(74) *Attorney, Agent, or Firm*—Foley & Lardner LLP

(57) ABSTRACT

A post hole digger for producing a hole in the ground comprising a first handle pivotally coupled to a second handle and a first blade coupled to the first handle and a second blade coupled to the second handle. The first handle and the second handle extend along a plane defined generally by a longitudinal axis of the first handle and a longitudinal axis of the second handle when the first blade and the second blade are in the open configuration. The first blade and the second blade are generally parallel to the plane and spaced apart from the plane when provided in the open configuration.

22 Claims, 4 Drawing Sheets

U.S. PATENT DOCUMENTS

| | | |
|---|---|---|
| 2,192,399 A | 3/1940 | Downes |
| 2,230,498 A | 2/1941 | Loos et al. |
| 2,435,473 A | 2/1948 | Sonnenberg |
| 2,644,455 A * | 7/1953 | Benoit ................. 294/50.8 |
| 2,654,626 A | 10/1953 | Rice |
| 2,710,765 A | 6/1955 | Arens |
| 2,791,879 A | 5/1957 | Truran |
| 4,042,270 A | 8/1977 | Weiland |
| 4,057,277 A * | 11/1977 | Burkholder ............ 294/50.8 |
| 5,273,331 A | 12/1993 | Burnham |
| 5,320,363 A | 6/1994 | Burnham |
| 5,427,424 A | 6/1995 | Robinson |
| 5,478,128 A | 12/1995 | Aaland |
| 5,669,648 A | 9/1997 | Luck |
| 5,727,828 A | 3/1998 | Jones |
| 5,743,579 A | 4/1998 | Ranburger |
| 5,820,183 A | 10/1998 | Marcus |
| 6,089,632 A | 7/2000 | Pickren |
| 6,273,482 B1 | 8/2001 | Pickren |

FOREIGN PATENT DOCUMENTS

| | | |
|---|---|---|
| DE | 1032172 | 6/1958 |
| GB | 115 715 | 5/1918 |
| GB | 180 839 | 6/1922 |
| GB | 909 060 | 10/1962 |
| NL | 8300259 | 8/1984 |

* cited by examiner

POST HOLE DIGGER

CROSS-REFERENCE TO RELATED PATENT APPLICATIONS

The present application claims the benefit of and priority as available under 35 U.S.C. §§ 119-21 to the following U.S. patent application (which is incorporated by reference in the present application): U.S. Provisional Patent Application No. 60/461,089 titled "POST HOLE DIGGER" filed Apr. 8, 2003.

BACKGROUND

The present invention generally relates to post hole diggers. The present invention more specifically relates to a post hole digger that enables a user to conveniently produce a vertical hole in the ground with minimal interference between the post hole digger and the sides of the vertical hole.

It is generally known to provide a post hole digger for digging holes within the earth for placement of a post therein. Traditional post hole diggers include two concave blades that face one another to form a cylindrical region generally about six inches in diameter. The blades are pivotally connected to one another proximate the top portion of the blades. Extending from each blade is a fixture or cap supporting a shaft handle extending approximately four feet in height. The blades are spaced apart from one another such that each shaft is proximate the inner surface of each of the blades. By thrusting the blades into the ground, the earth is secured between the blades by moving the upper end of the handles away from one another forcing the blades to pivot about the pivot toward one another.

As the hole becomes deeper, the pivoting motion of the blades results in the shafts contacting the edge of the hole proximate the top of the hole. This minimizes the pivoting motion of the blades and thereby reduces the amount of dirt that can be pulled out with each pivoting motion of the shafts. As a result, a user is often forced to widen the width of the hole in order to accommodate the shafts. This can result both in excess effort from the user, as well as an increased use of cement and/or other type of filling for the hole. Further, the use of the fixtures extending from the blades to support the shafts can often interfere with the sight line of the user with respect to the blades, thereby inhibiting free visual access to the hole during use of the post hole digger. Additionally, the traditional wood and plastic handles or shafts are subject to breaking near the fixture that holds them. Further, the nuts and bolts that connect the handles to the fixtures typically loosen during use.

Accordingly, it would be advantageous to provide a post hole digger that allows for full pivoting of the blades relative to one another while minimizing the contact between the shafts and the upper edge of the hole. It would also be advantageous to provide a post hole digger that enables a user to dig deeper post holes without having to increase the diameter of the hole opening as the depth of the hole increases. It would also be advantageous to provide a post hole digger that enables a user to close the blades of the post hole digger without having the handles or shafts wider than the diameter of the top of the hole. It would also be desirable to provide a post hole digger having shafts with a configuration that maximizes the sight line of the post hole digger. It would also be desirable to provide a post hole digger having a handle arrangement and blade attachment that minimizes the chances of the handles breaking or loosening during use.

It would be advantageous to provide a post hole digger or the like of a type disclosed in the present application that provides any one or more of these or other advantageous features. The present invention further relates to various features and combinations of features shown and described in the disclosed embodiments. Other ways in which the objects and features of the disclosed embodiments are accomplished will be described in the following specification or will become apparent to those skilled in the art after they have read this specification. Such other ways are deemed to fall within the scope of the disclosed embodiments if they fall within the scope of the claims which follow.

SUMMARY

One embodiment of the invention relates to a post hole digger. The post hole digger comprises a first shaft pivotally coupled at a pivot to a second shaft, the first shaft and the second shaft each comprising an upper end, a lower end, and a central portion having a central axis, and a first blade coupled to the first shaft at the lower end of the first shaft and a second blade coupled to the second shaft at the lower end of the second shaft. The central axis of the first shaft and the central axis of the second shaft generally define a plane when the first blade and the second blade are provided in an open configuration. The first blade and the upper end of the first shaft are located on a first side of the plane when the first blade and the second blade are provided in the open configuration. The second blade and the upper end of the second shaft are located on a second side of the plane when the first blade and the second blade are provided in the open configuration. The upper end of the first shaft and the upper end of the second shaft may be pivoted away from one another to position the blades in a substantially closed configuration.

Another embodiment of the invention relates to a post hole digger. The post hole digger comprises a first handle pivotally coupled to a second handle, the first handle and the second handle each having a longitudinal axis, and a first blade coupled to the first handle and a second blade coupled to the second handle. The first blade and the second blade are configured to pivot from an open configuration to a closed configuration by pivoting the first handle and the second handle away from one another. The first handle and the second handle extend along a plane defined generally by the longitudinal axis of the first handle and the longitudinal axis of the second handle when the first blade and the second blade are in the open configuration. The first blade and the second blade are generally parallel to the plane and spaced apart from the plane when provided in the open configuration.

Another embodiment of the invention relates to a method of producing a post hole digger. The method comprises providing a first shaft pivotally coupled to a second shaft, the first shaft and the second shaft comprising an upper end, a lower end, and a central portion having a longitudinal axis, and providing a first blade coupled to the first shaft and a second blade coupled to the second shaft. The method comprises configuring the first blade and the second blade to pivot from an open configuration to a closed configuration by pivoting the upper ends of the first shaft and the second shaft away from one another. The method comprises configuring the central portions of the first shaft and the second shaft to extend along a plane generally defined by the longitudinal axis of the first and second shaft when the first blade and the second blade are in the open configuration. The method comprises configuring the first blade and the second blade to be generally parallel to the plane and spaced apart from the plane when provided in the open configuration.

DETAILED DESCRIPTION

Figure 1:
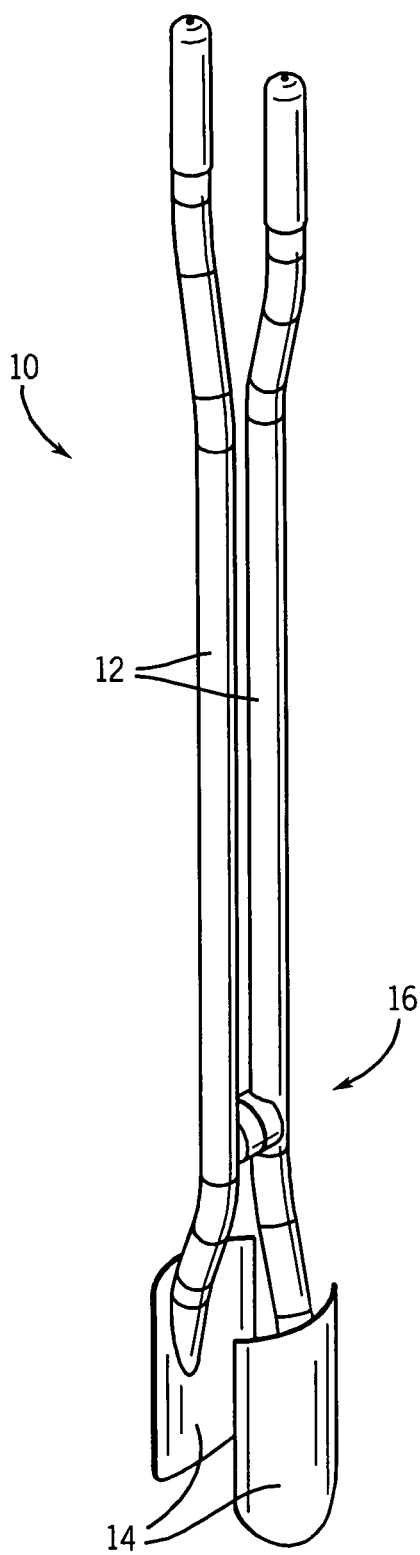
FIG. 1 is a front perspective view of a post hole digger according to an exemplary embodiment.

Before explaining a number of preferred, exemplary, and alternative embodiments of the invention in detail, it is to be understood that the invention is not limited to the details or methodology set forth in the following description or illustrated in the drawings. The invention is capable of other embodiments or being practiced or carried out in various ways. It is also to be understood that the phraseology and terminology employed herein is for the purpose of description and should not be regarded as limiting.

A system (shown as a post hole digger 10) for digging holes within the earth (e.g., for the placement of posts, fences, poles, etc.) is shown in FIG. 1 according to a preferred embodiment. Post hole digger 10 may be operated by a user to dig deeper, more uniform diameter post holes without having to widen the upper portion of the hole. Post hole digger 10 enables a user to close the blades of the post hole digger 10 without having the handles or shaft wider than the diameter of the top of the hole.

Figure 2:
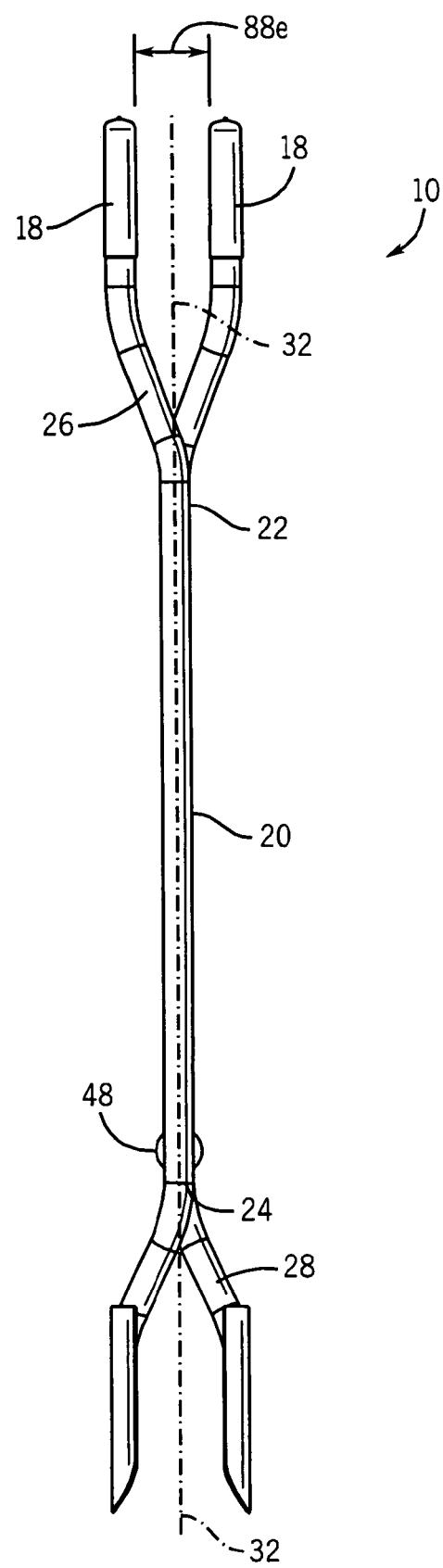
FIG. 2 is a side view of the post hole digger according to an exemplary embodiment.
Figure 3:
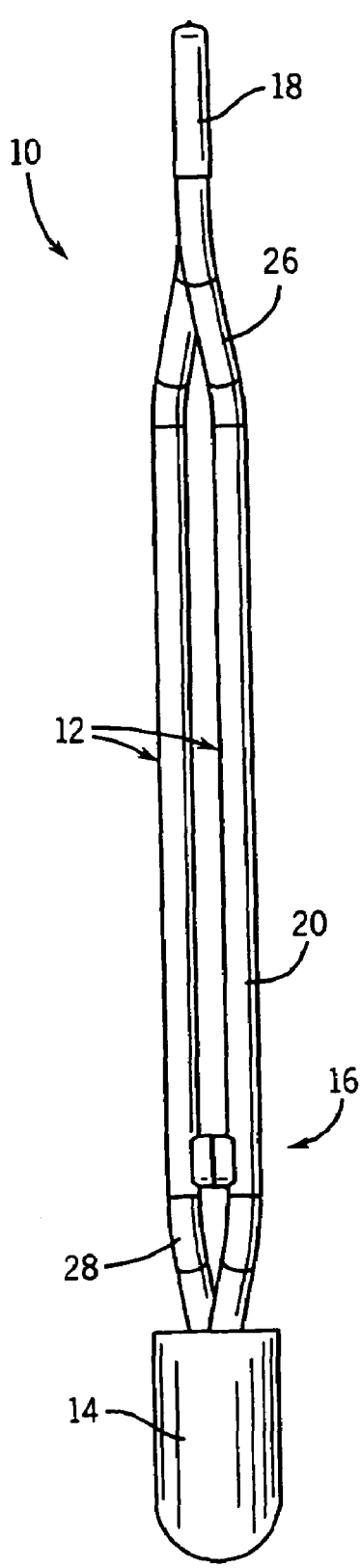
FIG. 3 is a front view of the post hole digger according to an exemplary embodiment.
Figure 5:
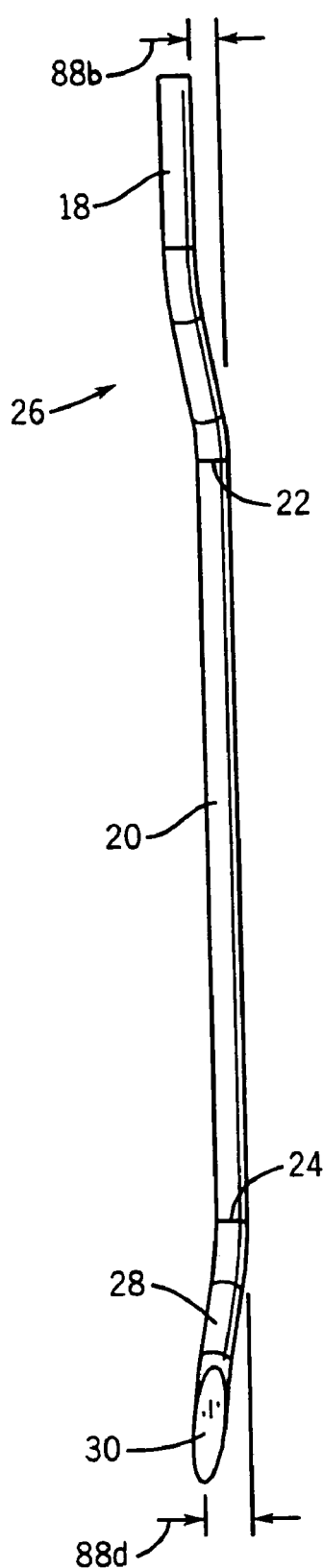
FIG. 5 is a front view of a shaft of the post hole digger according to an exemplary embodiment.

Referring to FIG. 1, post hole digger 10 includes a pair of shafts 12 and a pair of blades 14 attached to shafts 12. Shafts 12 are pivotally attached at a pivot 16. Referring to FIGS. 2, 3 and 5, each shaft 12 includes a grip 18, a central portion 20, an upper end 22, and a lower end 24. Each shaft 12 further includes an upper transition 26 between grip 18 and central portion 20 and a lower transition 28 extending from the lower end 24 of the central portion 20 of shaft 12. As shown in FIGS. 1-3 and 9, shafts 12 may be attached to pivot 16 along central portion 20 proximate lower transition 28. According to various alternative embodiments, shafts 12 may be attached to pivot 16 at any suitable point along shafts 12. The lower end 24 includes an engagement face or surface 30 that is directly connected to each respective blade 14. According to an exemplary embodiment, engagement surface 30 may be formed by flattening the lower portion of shaft 12. According to an alternative embodiment, the lower portion of shaft 12 may be cut to provide the beveled profile of engagement surface 30.

Figure 4:
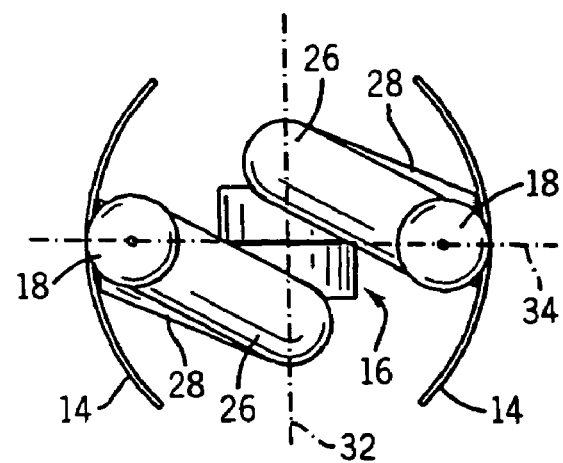
FIG. 4 is a top view of the post hole digger according to an exemplary embodiment.

FIGS. 2 and 4 show the post hole digger 10 in a non-extended or stowed configuration (e.g., the blades 14 are in an open position). When in the non-extended configuration, and as shown in FIGS. 2 and 4, the longitudinal axis of each of central portions 20 of shafts 12 define a plane 32 which also extends through the central axis of pivot 16. Grip 18 and engagement surface 30 of each shaft 12 are both located on the same respective side of plane 32. As shown in FIG. 4, a second plane 34 is perpendicular to plane 32 and to the central portion of each blade 14. Second plane 34 extends through each grip or handle 18 as well as through pivot 16 and is perpendicular to the central axis of pivot 16. Upper and lower transitions 26, 28 of each shaft 12 extend from plane 34 at a predefined angle toward central potion 20 (and plane 32).

Figure 6:
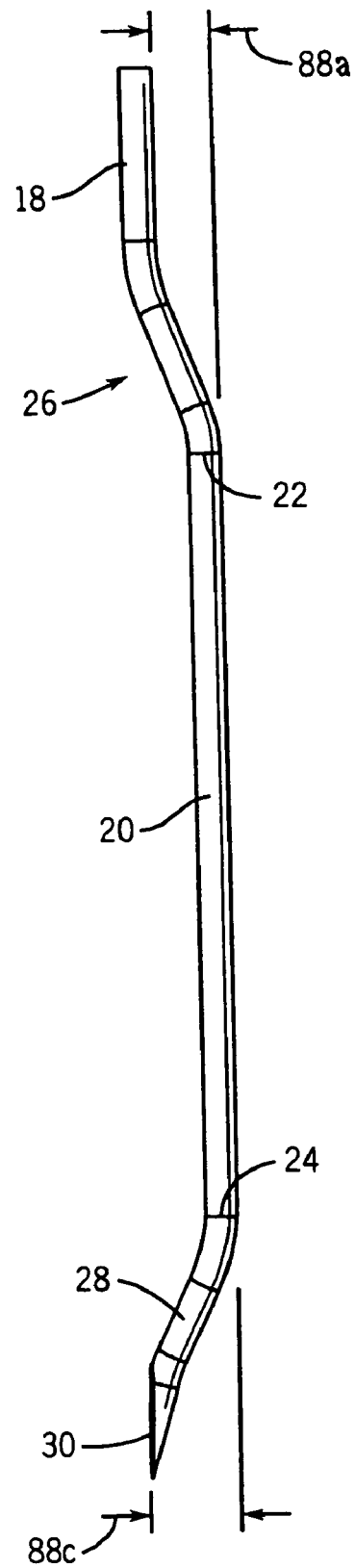
FIG. 6 is a side view of the shaft of the post hole digger according to an exemplary embodiment.

According to an exemplary embodiment, as shown in FIG. 6, the upper transition 26 may include a compound angle such that handle 18 is spaced a predetermined distance from an edge of the central portion 20 of post hole digger 10. For example, length 88a between the edge of grip 18 and the edge of central portion 20 may be approximately 2 inches. As shown in FIG. 5, length 88b between the edge of grip 18 and the edge of central portion 20 may be approximately 1 inch. Similarly, lower transition 28 includes a compound angle such that engagement surface 30 is a predetermined distance from an edge of central portion 20 of post hole digger 10. For example, as shown in FIG. 6, length 88c between the edge of engagement surface 30 and the edge of central portion 20 may be approximately three inches. As shown in FIG. 5, length 88d between the edge of engagement surface 30 and the edge of central portion 20 may be approximately one inch.

Referring to FIGS. 2 and 4, the blades are in the open position. According to an exemplary embodiment, the handles 18 may spaced approximately two to four inches apart from one another when in the open position as shown by length 88e. Of course the exact distance between the handles may vary according to various exemplary embodiments. According to an exemplary embodiment, both of the handles fit within a cylindrical plane defined by the shape of the blades 14.

Figure 7:
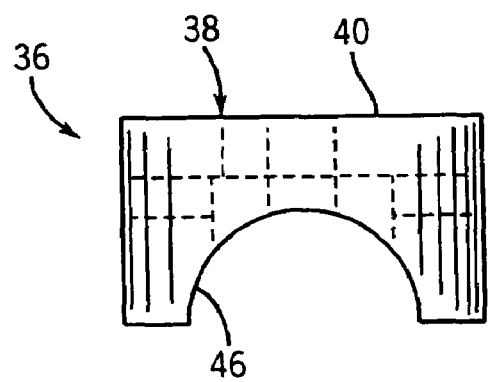
FIG. 7 is a plan view of a pivot bearing of the post hole digger according to an exemplary embodiment.
Figure 8:
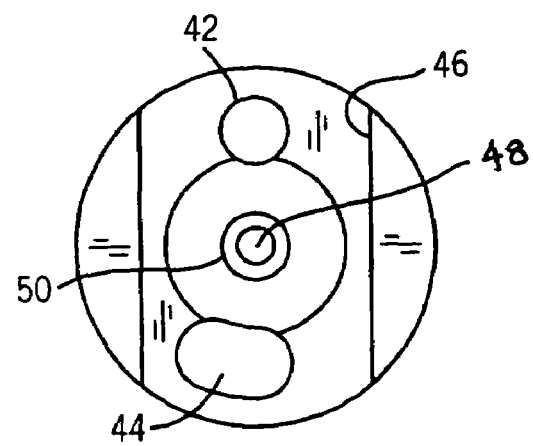
FIG. 8 is a side view of the pivot bearing of the post hole digger according to an exemplary embodiment.

Referring to FIGS. 7 and 8 pivot 16 will be described in greater detail. Pivot 16 includes a pair of bearings 36. Each bearing 36 includes a bearing surface 38. Bearing surface 38 may include either a coating or a separate material 40 being corrosion resistant, non-rusting, and having a low coefficient of friction. Each bearing 36 further includes a pin 42 extending therefrom that is received in a corresponding slot 44 on the other bearing 36. This pin and slot arrangement limits the rotation of the bearings relative to one another and as a result limits the rotation of blades 14. Slot 44 allows bearing 36 to pivot a predefined angle from the vertical. According to an exemplary embodiment, slot 44 is configured to allow bearing 36 to pivot between 10 and 35 degrees from the vertical. According to a preferred embodiment, slot 44 is configured to allow bearing 36 to pivot about 20 to 25 degrees from the vertical, and more preferably about 22.5 degrees from the vertical.

According to an exemplary embodiment, bearing 36 includes an arcuate inner surface 46 located opposite bearing surface 38 that is proximate shaft 12. In one embodiment, each bearing 36 is welded to the outer surface of each respective shaft 12 such that inner surface 46 is adjacent shaft 12. According to an exemplary embodiment, a pivot pin 48 need only extend through bearings 36 and not necessarily through shafts 12. In an alternative embodiment, pivot pin 48 extends through each shaft 12 and through each opening 50 extending through each bearing 36. According to various alternative embodiments, it is also possible to both weld bearing 36 to each shaft as well as to have pivot pin 48 extend through the shafts. Regardless of whether the bearing is welded to or mechanically attached to shafts 12, the bearing surface 38 preferably rotates within plane 34.

Figure 9:
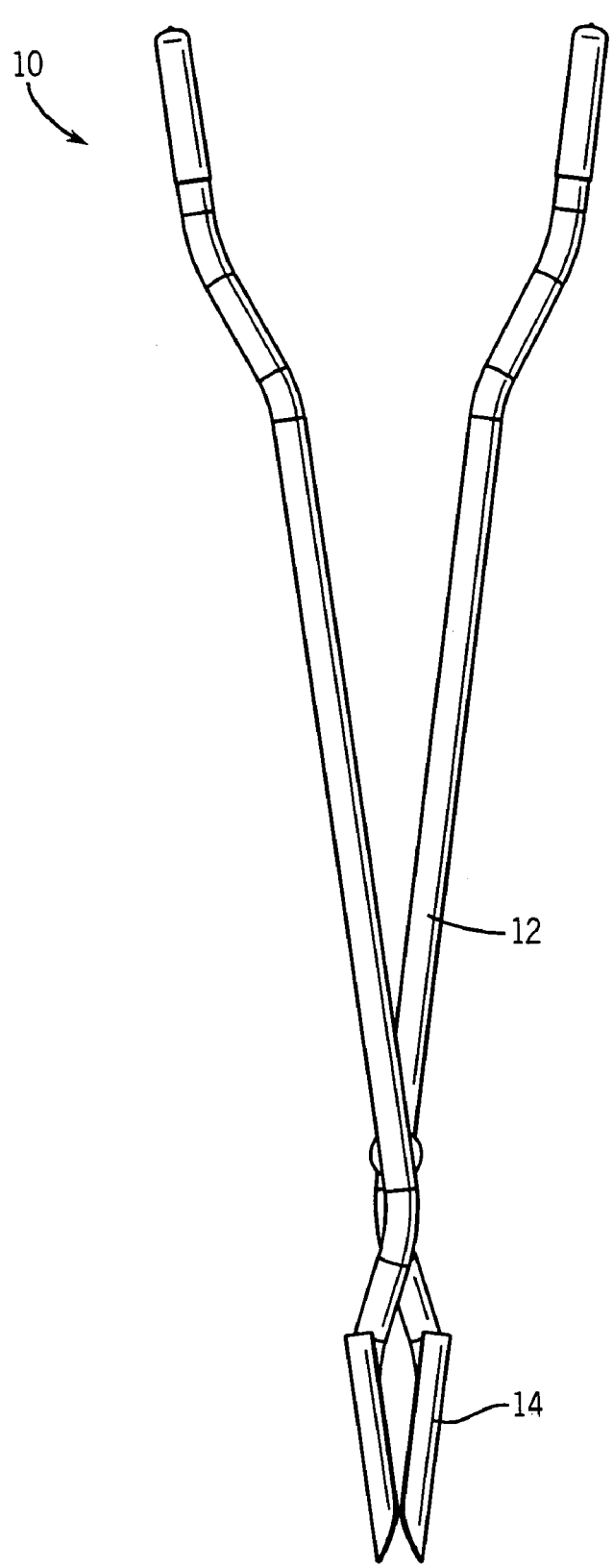
FIG. 9 is a side view of the post hole digger in the closed position according to an exemplary embodiment.

Referring to FIG. 9 post hole digger 10 is shown in a fully closed position (e.g., the post hole digger 10 is located within a hole in the ground). According to an exemplary embodiment, the post hole digger may be configured such that if the hole is six inches in diameter or equal to the distance between blades 14 when the blades are in the open position, then the outside of shafts 12 would contact the upper edge of the hole when the hole is 32 inches deep. According to this embodiment, if the hole is twelve inches in diameter, shafts 12 would contact the upper edge of the hole when the hole is 48 inches deep.

To operate the post hole digger 10, a user grasps and hold grips 18 in the non-extended position shown in FIGS. 2 and 4. The user may then thrust the blades 14 into the ground. As shown in FIG. 9, the user may move the grips away from one another so that shafts 12 pivot about pivot 16 and blades 14 close and grip the soil therebetween. The user may then lift the post hole digger 10 out of the hole while continuing to pull the grips 18 apart. Once the post hole digger 10 is removed from the hole, the user may move the grips toward one another so that shafts 12 pivot about pivot 16 and blades 14 move apart from one another, thereby releasing the soil from between the blades 14.

According to various exemplary embodiments, the assemblies and components of the post hole digger may be constructed from various different materials. According to a preferred embodiment, the assemblies and components of the post hole digger may be constructed from materials that are durable, substantially non-corroding, and light weight. For example, a variety of plastics (e.g., high-impact), polymers, rubber, etc. may be used for construction or assembly of the grip. Using rubber or plastic offers several advantages including that the grip may be constructed in a variety of different colors, surface finishes, textures, opacity, etc. According to various exemplary embodiments, a variety of suitable materials may be used for other components (such as the shafts and blades) of the post hole digger, including metals, alloys, composites, aluminum, stainless steel, fiberglass, wood, etc. Further, various parts of the post hole digger may be constructed and assembled as a single integrally formed piece or may be constructed and assembled from multiple parts.

Figure 10:
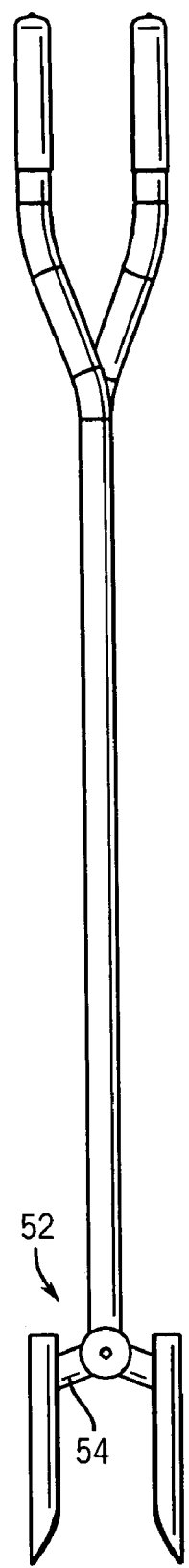
FIG. 10 is a side view of a post hole digger according to an alternative embodiment.

It is important to note that the construction and arrangement of the elements of the post hole digger as shown in the various embodiments is illustrative only. Although only a few embodiments of the present inventions have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, colors, orientations, etc.) without materially departing from the novel teachings and advantages of the subject matter disclosed in this application. For example, referring to FIG. 10, a pivot 52 may be located below or proximate the upper edge of blades 14. Further the lower transition portion 54 may be formed of a separate component that is welded to or mechanically attached to the central portion of the shafts. Accordingly, all such modifications are intended to be included within the scope of the present invention. The order or sequence of any process or method steps may be varied or re-sequenced according to alternative embodiments. In any claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present inventions.

What is claimed is:

1. A post hole digger comprising:
 a first shaft pivotally coupled at a pivot to a second shaft, the first shaft and the second shaft each comprising an upper end having a longitudinal axis, a lower end, and a central portion having a central axis, and an upper transition section between the upper end and the central portion;
 a first blade coupled to the first shaft at the lower end of the first shaft and a second blade coupled to the second shaft at the lower end of the second shaft;
 wherein the first shaft and the second shaft pivot about a pivot axis;
 wherein the central axis of the first shaft, the central axis of the second shaft, and the pivot axis generally define a first plane that extends along the pivot axis when the first blade and the second blade are provided in an open configuration;
 wherein the longitudinal axis of the upper end of the first shaft and the longitudinal axis of the upper end of the second shaft define a second plane that is substantially perpendicular to the first plane;
 wherein the first blade and the upper end of the first shaft are located on a first side of the first plane when the first blade and the second blade are provided in the open configuration;
 wherein the second blade and the upper end of the second shaft are located on a second side of the first plane when the first blade and the second blade are provided in the open configuration;
 wherein the upper end of the first shaft and the upper end of the second shaft may be pivoted away from one another to position the blades in a substantially closed configuration; and
 wherein the upper transition section of the first shaft and the upper transition section of the second shaft each extend at a first angle relative to the first plane and a second angle relative to the second plane.

2. The post hole digger of claim 1, wherein the lower end of the first shaft comprises a lower transition section between the first blade and the central portion of the first shaft and the lower end of the second shaft comprises a lower transition section between the second blade and the central portion of the second shaft.

3. The post hole digger of claim 2, wherein the lower transition section on the first shaft and the lower transition section on the second shaft extend at a third angle relative to the first plane and a fourth angle relative to the second plane, so that the first blade and the second blade are symmetric relative to the first plane and the second plane.

4. The post hole digger of claim 1, wherein the pivot is proximate the lower end of the first shaft and proximate the lower end of the second shaft.

5. The post hole digger of claim 4, wherein the lower end of the first shaft includes a first engagement surface that is directly coupled to the first blade and wherein the lower end of the second shaft includes a second engagement surface that is directly coupled to the second blade.

6. The post hole digger of claim 1, wherein the first shaft is coupled to the pivot along the central portion proximate the lower end of the first shaft and the second shaft is coupled to the pivot along the central portion proximate the lower end of the second shaft.

7. The post hole digger of claim 1, wherein the pivot comprises a pair of bearings.

8. The post hole digger of claim 7, wherein the pair of bearings each comprise a bearing surface oriented substantially parallel to the second plane and having a generally low coefficient of friction.

9. The post hole digger of claim 8, wherein each bearing further comprises a pin extending therefrom and received in a corresponding slot on the other bearing.

10. The post hole digger of claim 9, wherein the pins and slots allow the pair of bearings to pivot a predefined angle from the vertical.

11. A post hole digger comprising:
a first handle pivotally coupled to a second handle by a pivot assembly, the first handle and the second handle each having a longitudinal axis;
a first blade coupled to the first handle and a second blade coupled to the second handle;
wherein the first blade and the second blade are configured to pivot from an open configuration to a closed configuration by pivoting the first handle and the second handle away from one another about a pivot axis defined by the pivot assembly;
wherein the pivot assembly comprises a first bearing coupled to the first handle and a second bearing coupled to the second handle, the first bearing and the second bearing each having a bearing surface, the first bearing having one of a pin and an arcuate slot, and the second bearing having the other of the pin and the arcuate slot, so that the first bearing and the second bearing are rotatable with respect to each other about the pivot axis with the first bearing surface interfacing with the second bearing surface, and with the pin slidably received in the arcuate slot limit rotation of the blades;
wherein the longitudinal axis of the first handle, the longitudinal axis of the second handle and the pivot axis generally define a plane that extends along the pivot axis when the first blade and the second blade are provided in an open configuration;
wherein the first blade and the second blade are generally parallel to the plane and spaced apart from the plane when provided in the open configuration.

12. The post hole digger of claim 11, wherein the first blade and the first handle are located on a first side of the plane and the second blade and the second handle are located on a second side of the plane when the first blade and the second blade are provided substantially in the open configuration.

13. The post hole digger of claim 12, wherein the first blade and the second blade may be moved from the open configuration to the closed configuration by pivoting the first handle and the second handle away from one another.

14. The post hole digger of claim 11, wherein the pivot assembly comprises a first pin and a first arcuate slot disposed on the bearing surface of the first bearing and a second pin and a second arcuate slot disposed on the bearing surface of the second bearing, the first arcuate slot configured to slidably receive the second pin and the second arcuate slot configured to slidably receive the first pin.

15. The post hole digger of claim 11, wherein the bearings are coupled to the shafts by one welding and a pivot pin.

16. The post hole digger of claim 11, wherein the pin and the slot permit the bearings to pivot a predefined angle from the vertical.

17. The post hole digger of claim 11, wherein the first handle is coupled to the first bearing of the pivot assembly between a central portion and a lower portion of the first handle and the second handle is coupled to the second bearing of the pivot assembly between a central portion and a lower portion of the second handle.

18. A method of producing a post hole digger comprising:
providing a first shaft pivotally coupled to a second shaft, the first shaft and the second shaft comprising an upper end, an upper transition section, a lower end, and a central portion having a longitudinal axis;
providing a pivot assembly defining a pivot axis and comprising a first bearing and a second bearing, the first bearing having one of a pin and an arcuate slot, and the second bearing having the other of the pin and the arcuate slot, so that the pin is slidably received in the slot to define a rotational limit when the bearings are rotated with respect to one another;
coupling the first bearing to the first shaft and coupling the second bearing to the second shaft;
configuring the longitudinal axis of the first handle, the longitudinal axis of the second handle, and the pivot axis to generally define a first plane that extends along the pivot axis when the first blade and the second blade are provided in an open configuration;
configuring an axis of the upper end of the first shaft and an axis of the upper end of the second shaft to define a second plane that is substantially perpendicular to the first plane;
configuring the upper transition section of the first shaft and the upper transition section of the second shaft to each extend at a first angle relative to the first plane and a second angle relative to the second plane; and
coupling a first blade to the first shaft and coupling a second blade to the second shaft so that the first blade and the second blade are disposed on opposite sides of the first plane.

19. The method of claim 18, wherein the first angle and the second angle are arranged so that the upper end of the first shaft and the upper end of the second shaft are spaced a predetermined distance from the first plane.

20. The method of claim 19, further comprising providing a first lower transition between the first blade and the central portion of the first shaft and providing a second lower transition between the second blade and the central portion of the second shaft.

21. The method of claim 20, further comprising configuring the first lower transition and the second lower transition so that the first blade and the second blade are spaced a predetermined distance from the first plane.

22. The method of claim 21, further comprising positioning the first blade and the upper end of the first shaft on a first side of the first plane and along the second plane and positioning the second blade and the upper end of the second shaft on a second side of the first plane and along the second plane.

* * * * *